3,100,183
FUEL COMPOSITION FOR NUCLEAR REACTORS
James C. Andersen, Niagara Falls, N.Y., assignor to the United States of America as represented by the United States Atomic Energy Commission
No Drawing. Filed Feb. 6, 1962, Ser. No. 171,534
10 Claims. (Cl. 204—154.2)

This invention deals with a fuel composition for nuclear reactors and in particular with a fuel composition that is refractory and thus usable for reactors that operate at high temperatures.

A mixture of uranium oxide and silicon carbide has been investigated for fuel of high-temperature reactors, but these compositions proved very unstable at elevated temperatures; when they reached a temperature of about 1500° C. in air, considerable uranium losses occurred and they cracked. The uranium oxides also reacted with the silicon carbide, which might have been the cause of the dimensional changes that were observed at elevated temperatures.

It is an object of this invention to provide a fuel composition for nuclear reactors that is resistant to oxidation at temperatures as high as 1500° C., so that it can be used for reactors operating at such high temperatures in air.

It is another object of this invention to provide a fuel composition for nuclear reactors that has a high strength at temperatures up to about 1500° C. and does not suffer any deformation under a high and continuous compressive load.

It is also an object of this invention to provide a fuel composition for nuclear reactors that has a high density and good heat conductivity.

It is a further object of this invention to provide a fuel composition for nuclear reactors that does not crack or otherwise change dimensionally at the elevated temperatures often used in reactors.

It is finally also an object of this invention to provide a fuel composition for nuclear reactors in which a loss of fuel, e.g. uranium, does not occur when the composition is exposed to high temperatures.

It has been found that a fuel composition that contains silicon carbide as the basic refractory material and uranium silicide, $USi_3$, as the fuel material, has most of the advantages enumerated above.

However, the uranium silicide in such a mixture was still found to oxidize rather rapidly in air when the temperature reached 600° C.; it burns at that temperature with a bright glow and disintegrates into a powder. A compound, a stabilizer, was advantageously added to avoid this oxidation phenomenon; such a stabilizer had to be refractory, and it had to be compatible with the uranium silicide at elevated temperature.

A stabilizer found suitable for the composition of this invention was nickel aluminide; it was formed during the preparation of the fuel body or fuel element by the reaction of elemental nickel and aluminum added to the fuel mixture. Another stabilizer is molybdenum disilicide; it also can be formed in situ from molybdenum and silicon.

Apart from the stabilizer, it was also found advantageous, though optional, to incorporate a compound by which the density of the final composition is still furthermore improved. Zirconium oxide was found to be satisfactory for this purpose. The zirconia can be formed in situ by the addition of zirconium hydride and heat decomposition during the densification step, as will be described later.

The composition of this invention thus comprises silicon carbide, uranium trisilicide and nickel aluminide; and it optionally, but preferably, also contains molybdenum disilicide and zirconia. A quantity of uranium silicide of from 15 to 25% by weight has been found suitable, while nickel was preferably added in a quantity of about 15% and aluminum of between 6 and 10%; all these quantities are weight percentages and refer to the amount of silicon carbide. The zirconia content advantageously ranges between 0 and about 1% and the molybdenum content between about 20 and 30%.

In mixing the various ingredients for the fuel composition, it is advantageous to add a binder. A suitable binder composition is a mixture of a phenol-formaldehyde resin having a low formaldehyde:phenol ratio and containing sodium hydroxide as a catalyst with a solid nonvolatile water-soluble polyethylene glycol having a viscosity of between 6000 and 7500 Saybolt seconds at 100° C. and a molecular weight of 6000.

Two methods were used for the preparation of the uranium silicide. According to one method the uranium silicide was formed in situ by reacting a mixture of uranium dioxide, silicon and carbon during the densification step at a temperature of between 1600 and 1800° C., as will be described later. During this reaction uranium silicide and silicon carbide are formed, and the carbon is volatilized in the form of carbon monoxide and/or carbon dioxide. This method, however, was not very desirable, because the product was usally "contaminated" by uranium oxide.

A more satisfactory method was that of preparing the uranium silicide in a preliminary step, prior to mixing the ingredients for the fuel composition, by heating uranium and silicon powders at between 1600 and 1800° C., preferably at 1750° C., in an argon atmosphere; a better distribution of the uranium fuel in the final composition can then be obtained. This preformation step was either carried out in a silicon-carbide-lined graphite crucible or in a zirconia crucible. In the latter case, zirconium disilicide was formed and taken up by the uranium silicide, usually in a quantity corresponding to a zirconium content of about 1%. It was then that it was discovered that the fuel compositions made from the zirconium-containing uranium silicide had a greater density than those without zirconium, as has been stated previously.

The uranium silicide obtained by the separate synthesis was chemically analyzed and found to contain 71.96% by weight of uranium, 26.93% of silicon and .07% of iron, and 1% zirconium in the case of the zirconia crucible. X-ray analysis showed that the bulk of the product consisted of $USi_3$ with very small quantities of $UO_2$ present.

The fuel composition was then prepared, broadly by first mixing the ingredients, shaping or fabricating the mixture into fuel bodies or elements of predetermined configuration and dimension and then densifying the bodies by heating. More specifically, the uranium silicide is admixed with silicon carbide, carbon or graphite, nickel, aluminum, molybdenum, silicon, and a binder is advantageously added together with water in an amount to obtain a pasty consistency. (If the uranium silicide is formed in situ, molybdenum need not be added.) The mixture is then evacuated to remove air and formed into tubes or other appropriate bodies, for instance by extrusion through a die. The bodies are oven-dried at a temperature between 90 and 150° C. and then heated in an inert atmosphere while in contact with silicon or a silicon-zirconium hydride mixture, to a temperature of between 1700 and 2050° C., but preferably between 1700 and 1800° C. Silicon is preferably used in an excess over the amount necessary to convert excess carbon to silicon carbide. The silicon and zirconium penetrate the bodies immediately and react with the material of the bodies throughout the entire thickness; further heating causes volatilization of the nonreacted silicon.

In the following, a few examples are given of the process of making the fuel compositions of this invention.

Example I

Fuel tubes were fabricated by extrusion of a mixture of silicon carbide, carbon, uranium trisilicide, nickel, aluminum and molybdenum, all tubes having the same composition and having been made by the same process. These tubes were heated to about 2000° C. while in contact with silicon powder and surrounded by an argon atmosphere. Thirty-three of these tubes were tested for their heat and oxidation resistance by exposing them to air at a temperature of 600° C. for an entire week. Thirty one tubes withstood this treatment well, no changes being noticeable, while the other two were cracked. The 31 sound tubes were then exposed to still higher temperatures, again in air; it was found that they remained satisfactory up to temperatures of about 1500° C.

Example II

Three types of fuel tubes were prepared, each type having a different composition. Tubes A and C were shaped from the same mixture, namely of SiC, graphite, $USi_3$, Al, Mo and Ni, and tubes B from a mixture of SiC, graphite, $USi_3$ and Mo without the stabilizer-forming nickel and aluminum. While tubes A and B were densified, as described previously, namely by heating while in contact with a $ZrH_2$-containing silicon powder, tubes C were contacted with silicon powder only. The finished, heat-treated tubes were subjected to various tests.

The density of tubes B and C was about 3.3 while that of tubes A was 3.5. After exposure to 600° C. in air for an entire week, all of the eight tubes A tested were in satisfactory condition, none of the six tubes of group B tested were in good condition, while only 14 of the 24 tubes of group C had remained unchanged. This clearly shows the superiority of the tubes of group A.

The tubes of groups A and C were then tested for flexural strength at room temperature; the tubes of group A averaged 31,900 p.s.i., while those of group C averaged 22,300 p.s.i.

The tubes of group A were examined still further, first by determining the flexural strength values when the tubes were simply heated to different temperatures in an inert atmosphere and then at elevated temperature after the tubes had been exposed to air for 20 hours at the test temperature. The average results, in p.s.i., were as follows.

Heating only:
    At 1000° C_____ 16,600
    At 1250° C_____ 11,600
    At 1500° C_____ 9,000
After exposure to air for 20 hours:
    At 1475° C_____ 28,900
    At 1500° C_____ 33,130
    At 1550° C_____ 31,800

Another ten tubes of group A were heated in air at 600° C. for a week; after this the average flexural strength was 32,500 p.s.i.

Example III

Silicon carbide, 617.5 grams, was mixed with 156 grams of molybdenum, 134.5 grams of $USi_3$, 62.4 grams of graphite, 87.1 grams of nickel, 42.9 grams of aluminum, all in the form of powder, 198 grams of sodium-hydroxide-containing phenol-formaldehyde resin, 80 grams of polyethylene glycol and 70 grams of water by first blending the dry ingredients and then wetting the mixture with the resin-polyethylene glycol solution. Thereafter the water was added.

The mixture was first evacuated to remove any trapped air and then extruded through a die, whereby tubes were formed of an outer diameter of .283 inch and an inner diameter of .200 inch. These tubes were then oven-dried for several hours at 90° C. and for one additional hour at 130° C.

The tubes were then prepared for densification by placing them in contact with a mixture of silicon and zirconium hydride powders. This was done by placing the powders in the base of the fuel tubes and plugging their ends with tape to retain the powders. The silicon was present in the amount necessary to convert all contained free carbon in the tubes to silicon carbide and a 15% excess. Zirconium hydride was present in a quantity of 0.8%; a zirconium content of about 1% was obtained in the tube.

For densification, the tubes were placed into a tubular container which was pushed through a resistance-heated graphite furnace at the rate of about one inch per minute. The heated zone, about 30 inches long, was held at between 1950 and 2050° C. while an argon atmosphere was maintained in the furnace at atmospheric pressure. The reaction took place at about 1750° C., and the excess silicon volatilized at the temperature used.

After cooling, the tubes were examined for physical properties and analyzed chemically. The density of the fuel tubes was 3.41 g./cc. They withstood a temperature of 1500° C. without oxidation or cracking. The rupture modulus (pounds per square inch) was 30,850 at room temperature, 16,560 at 1000° C., 11,625 at 1250° C. and 8,890 at 1500° C. A chemical analysis of the fuel composition showed a uranium content of 5.24%; a silicon carbide content of 54.88%; 8.16% of free silicon; 1.67% of zirconium as the dioxide; 5.05% of aluminum; 4.43% of nickel; 11.62% of $MoSi_2$; 0.33% of iron; the balance was silicon bonded to uranium and possibly also to zirconium, oxygen and free carbon.

It will be understood that the invention is not to be limited to the details given herein but that it may be modified within the scope of the appended claims.

What is claimed is:

1. As a new composition of matter, a refractory fuel material for nuclear reactors composed of a mixture of from 15 to 25% by weight of uranium trisilicide, nickel aluminide in a quantity to yield a content of about 15% by weight of nickel and from 6 to 10% by weight of aluminum, the balance being silicon carbide, said percentages referring to the amount of silicon carbide.

2. As a new composition of matter, a refractory fuel material for nuclear reactors composed of a mixture of from 15 to 25% by weight of uranium trisilicide, nickel aluminide in a quantity to yield a content of about 15% by weight of nickel and from 6 to 10% by weight of aluminum, and up to 1.5% by weight of zirconia, the balance being silicon carbide, said percentages referring to the amount of silicon carbide.

3. As a new composition of matter, a fuel composition for nuclear reactors composed of a mixture of from 15 to 25% by weight of uranium trisilicide, nickel aluminide in a quantity to yield a content of about 15% by weight of nickel and from 6 to 10% by weight of aluminum, molybdenum disilicide in a quantity amounting to between 20 and 30% by weight of molybdenum, the balance being silicon carbide, said percentages referring to the amount of silicon carbide.

4. As a new composition of matter, a fuel composition for nuclear reactors composed of a mixture of from 15 to 25% by weight of uranium trisilicide, nickel aluminide in a quantity to yield a content of about 15% by weight of nickel and from 6 to 10% by weight of aluminum, molybdenum disilicide in a quantity amounting to between 20 and 30% by weight of molybdenum, and zirconia in a quantity of about 1% by weight, the balance being silicon carbide, said percentages referring to the amount of silicon carbide.

5. A process of making refractory fuel elements for nuclear reactors, comprising heating uranium and silicon powders at between 1600 and 1800° C. in an inert atmosphere whereby uranium trisilicide is formed, admixing silicon carbide, carbon, 15% by weight of nickel and aluminum powders to the uranium trisilicide obtained, fabricating the mixture obtained into the shape desired of the fuel elements, and densifying the shaped fuel elements by heating to between 1700 and 2050° C. in an inert atmosphere.

6. The process of claim 5 wherein molybdenum and silicon powders are also added to the silicon carbide prior to fabrication.

7. The process of claim 5 wherein up to 1.7% by weight of zirconium hydride are added to the silicon carbide prior to fabrication.

8. The process of claim 5 wherein an organic heat-decomposable binder is added to the mixture prior to shaping whereby a pasty mixture is obtained, and shaping is carried out by extrusion.

9. The process of claim 8 wherein the binder is a mixture of a phenol-formaldehyde resin, a water-soluble polyethylene glycol and water.

10. A process of making refractory fuel elements for nuclear reactors, comprising mixing uranium and silicon powders in a molar ratio of 1:3; heating the mixture obtained to between 1600 and 1800° C. in an inert atmosphere whereby uranium trisilicide is obtained; adding a silicon carbide-graphite mixture, aluminum, nickel, molybdenum to the uranium trisilicide; adding phenol-formaldehyde resin and an aqueous solution of polyethylene glycol to the mixture whereby a pasty material is obtained; evacuating the pasty material to remove the oxygen present; shaping the mixture into elements of predetermined configuration by extrusion; drying the elements obtained at between 90 and 150° C.; and densifying the elements by heating to between 1950 and 2050° C. in an inert atmosphere while in contact with a powdered mixture of silicon and zirconium hydride powders.

No references cited.